A. J. FELSMAN.
CORN PLANTER.
APPLICATION FILED JAN. 22, 1914.
1,111,220.
Patented Sept. 22, 1914.
3 SHEETS—SHEET 3.
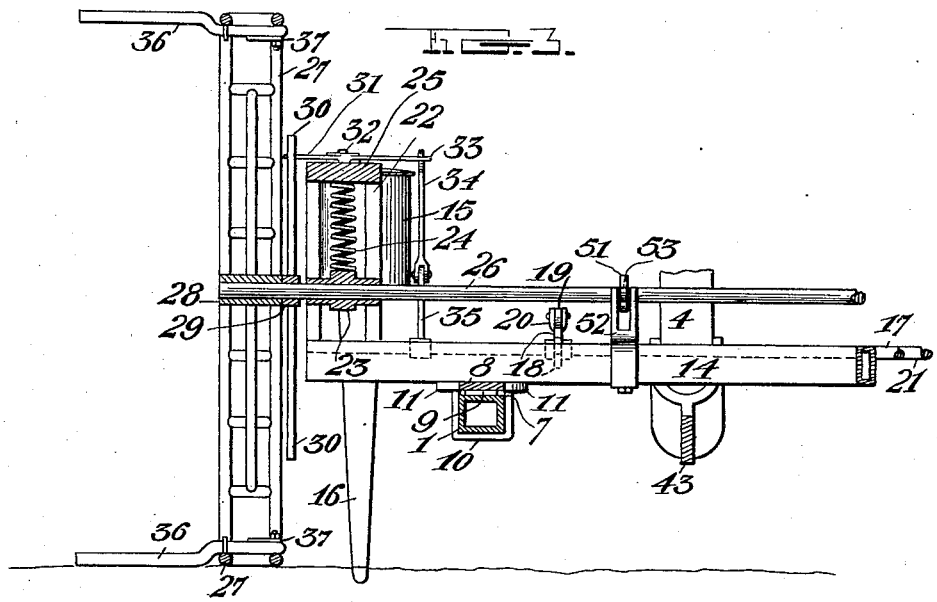
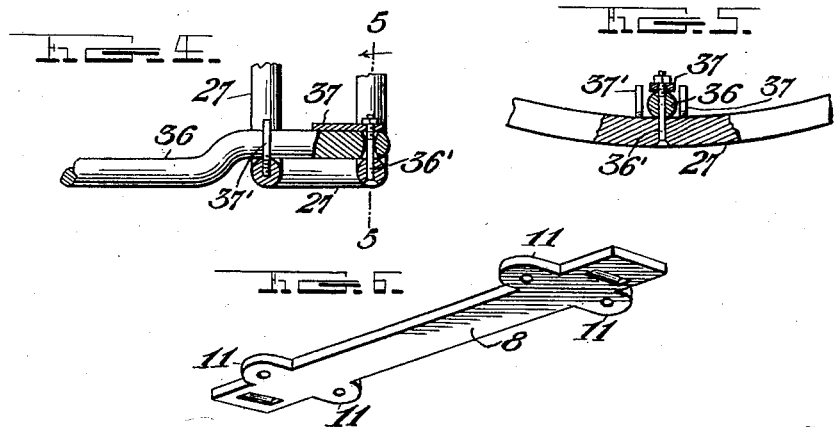
Witnesses
H. Woodard
C. Munker
Inventor
A. J. Felsman
By H. B. Willson & Co.
Attorneys

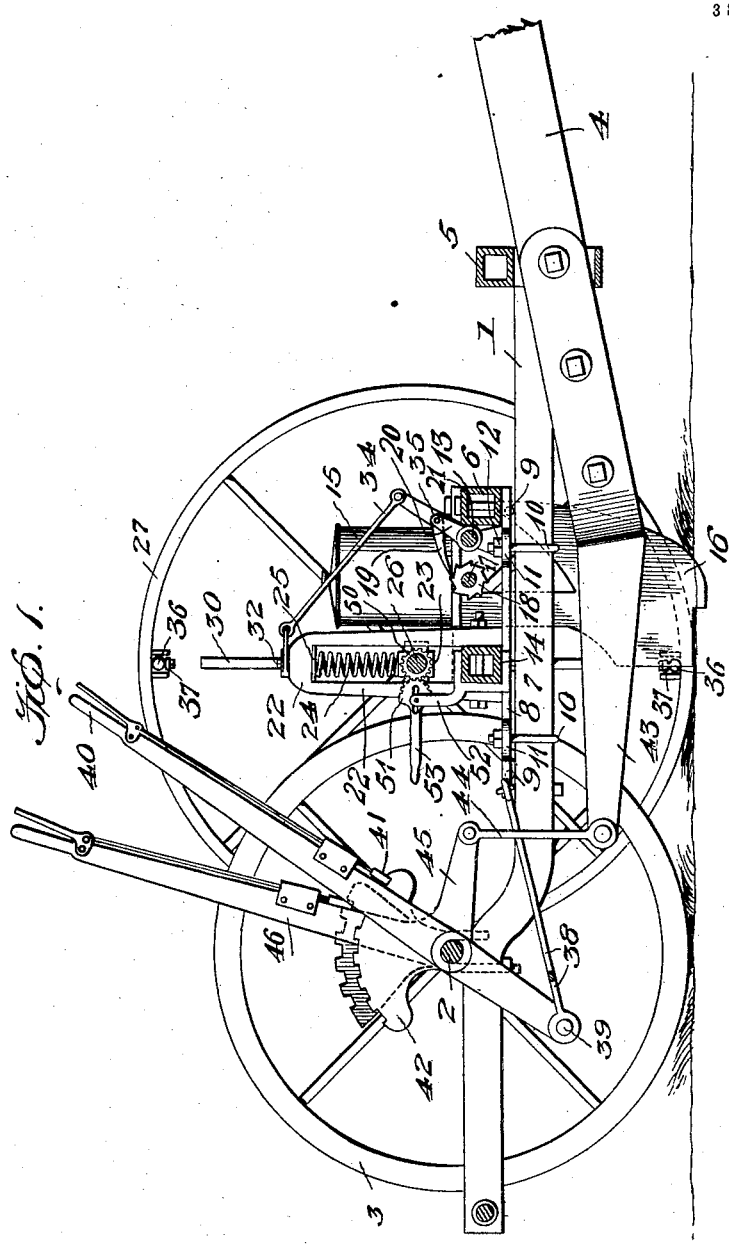

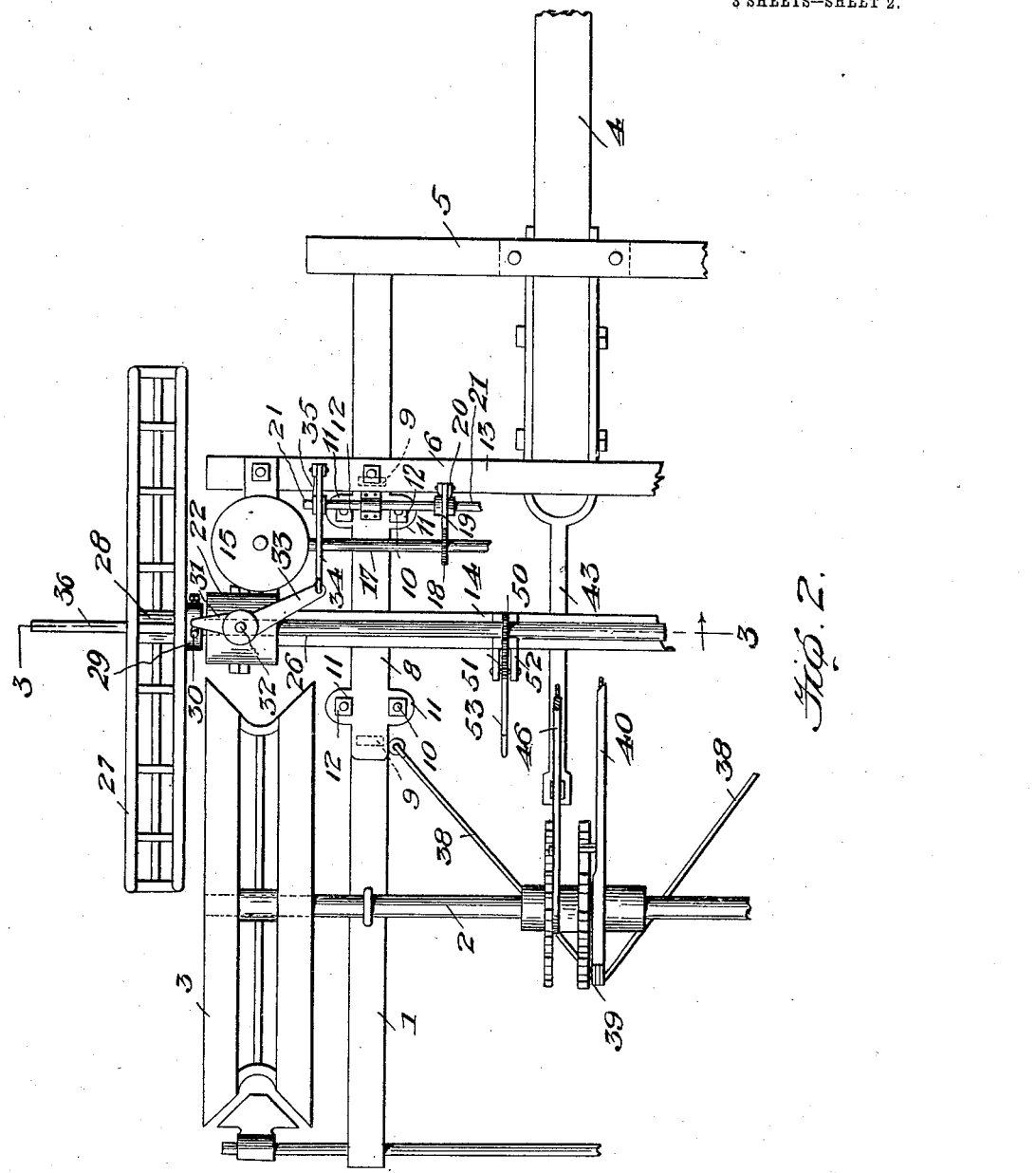

UNITED STATES PATENT OFFICE.

ALBERT J. FELSMAN, OF MACOMB, ILLINOIS.

CORN-PLANTER.

1,111,220.  Specification of Letters Patent.  Patented Sept. 22, 1914.

Application filed January 22, 1914. Serial No. 813,749.

*To all whom it may concern:*

Be it known that I, ALBERT J. FELSMAN, a citizen of the United States, residing at Macomb, in the county of McDonough and State of Illinois, have invented certain new and useful Improvements in Corn-Planters; and I do declare the following to be a full, clear, and exact description of the invention, such as will enable others skilled in the art to which it appertains to make and use the same.

This invention relates to improvements in corn planters, and the primary object of the same is to provide a planter constructed in such a manner as to obviate the necessity of using the check wire now in common use on many forms of planters.

To this end, a secondary object resides, in mechanism whereby the rows of corn planted may be checked in parallel rows both ways across the field and whereby should it be seen that the machine is not checking at the proper time, certain adjustments may be made, whereby the above mentioned effect is produced.

With the above objects in view, the invention resides in certain novel features of construction and combination, herein described and claimed, and shown in the drawings, wherein:

Figure 1 is a vertical longitudinal section of my improved corn planter; Fig. 2 is a plan view of a portion thereof; Fig. 3 is a transverse section on the line 3—3 of Fig. 2; Fig. 4 is a transverse section of a portion of one of the marking wheels; Fig. 5 is a detail section on line 5—5 of Fig. 4; and Fig. 6 is a perspective view of one of the carriages hereinafter described.

In the accompanying drawings, I have shown my improved corn planter as comprising a main frame 1, a supporting axle 2 rigidly secured thereto, supporting wheels revolubly mounted on the opposite ends of said axle 2, a tongue 4 pivotally connected to the front bar 5 of the frame 1, and a movable frame 6, which is mounted for longitudinal movement on the side bars of the frame 1, said movable frame carrying the seed dropping mechanism and marking devices to be more fully described herein.

The parallel side bars of the frame 1 are bowed downwardly near their forward portions and form tracks 7 upon which carriages 8 are mounted for longitudinal movement. The carriages 8 are here shown in the form of flat metal plates having their under sides recessed for the reception of anti-friction rollers 9 which are held in contact with the upper face of the tracks 7 by means of U-shaped clamps 10 which, as shown, embrace said tracks and have their ends projecting through ears 11 formed on the plates 8, said ends being threaded and provided with fastening nuts 12.

The carriages 8 on the opposite sides of the machine, are connected by front and rear cross bars 13 and 14 respectively, said bars being rigidly secured to the carriages by bolts or other suitable fastening means. The opposite ends of the bars 13 and 14 project suitable distances beyond the carriages 8 and support seed hoppers 15 which are disposed over seed shoes 16 in any desired manner, the usual shaft 17 operating the mechanism within the hoppers 15, said shaft being intermittently rocked to actuate said mechanism by means of a ratchet wheel 18 secured on said shaft and a pawl 19 which is pivotally connected to an arm 20 rigidly secured to an operating shaft 21, which is operated in a manner to be described.

The above mentioned seed shoes 16 are carried rigidly by the movable frame 6 to which they are secured in any appropriate manner, their location being necessarily beneath the hoppers 15 from which seed is dropped into the interior of said shoes as is common with devices of this character.

Rising from each end of the rear cross bar 14, is an upright guide yoke 22 within which bearing boxes 23 are mounted for vertical movement, said boxes being normally forced downward by means of coil springs 24 which bear against the head 25 of the yokes 22 and against the upper faces of said boxes. A shaft 26 is revolubly mounted in the boxes 23 and projects suitable distances beyond the yokes 22 and carries marking wheels 27 on its opposite ends.

Secured, as by a set screw, upon the shaft 26, is a collar 29 from which projects a pair of tappet arms 30 which are adapted to contact with the outer end 31 of a rock lever which is pivoted at 32 to the head 25 of one of the yokes 22, the inner end 33 of said lever being connected by means of a link 34 with an upwardly extending arm 35 which is rigidly secured on the shaft 21. By this mechanism it will be clearly seen that when one of the tappet arms 30 comes into contact with the outer end 31 of said lever, the latter will be rocked around its pivot 32, whereupon its inner end will pull rearwardly on the link 34 which will, through the action of the arm 35, rock the shaft 21 to engage the pawl 19 with the teeth of the ratchet 18, and thus turn the shaft 17 for actuating the mechanism within the hoppers 15 for dropping seed therefrom into the shoes 16.

The wheels 27 are provided with outwardly extending marking fingers 36 which are preferably pivoted to said wheels by bolts 36' which extend loosely through the inner ends of said fingers and through a portion of the rim of said wheels, flat springs 37 normally bearing said fingers outwardly and into contact with the outer portion of said rims, the latter having guide fingers 37' between which the fingers 36 work. The fingers 36 are so positioned in respect to the tappet arms 30, that when one of said arms contacts with the outer end 31 of the rock lever to actuate the dropping mechanism as above described, the finger 36 on the opposite side of the wheel 27 will mark the ground at a point directly opposite the hill of corn dropped.

In order to move the carriage 8 for a purpose to appear, I provide a pair of links 38 which are connected at their forward ends to the rear ends of said carriages, their rear ends being pivoted at 39 to the lower end of a lever 40 which is journaled around the axle 2 and carries a suitable dog 41 which is adapted to engage the teeth of a rack 42 to retain said carriages in their adjusted positions.

In order that the seed shoes 16 may be lifted from engagement with the ground when necessary, I extend the inner end of the tongue 4 a suitable distance in rear of its pivotal mounting on the bar 5 and secure a rearwardly extending forked arm 43 to said inner end, the arm 43 projecting rearwardly and being connected by means of a link 44 to a forwardly extending arm 45 of a lever 46 which, like the lever 40, is provided with a suitable dog and rack for holding it in adjusted position.

With the parts as above described, the entire machine may be propelled forwardly over the field to be planted, whereupon rows of properly spaced hills will be planted. During this trip, the seed dropping mechanism is operated in the above described manner through the action of the tappets 30 and the various connections between said tappets and said mechanism and the fingers 36 will, as before stated, produce a mark opposite each hill planted. When the end of the field is reached, the entire machine is of course turned around, and one of the marking fingers 36 is disposed in alinement with the mark made by the previous trip. When in this position, it will be understood that a hill of corn will be dropped, which hill will, of course, be in alinement with the hills in the two rows previously planted.

In order to properly position the fingers 36 at each end of the field when the return trip is started, I provide a spur gear 50 rigidly secured on the shaft 26 and adapted to mesh with a toothed segment 51 which is slidably and pivotally connected with a bracket 52 secured to the rear cross bar 14 of the frame 6, a suitable operating handle 53 being provided for the purpose of manipulating the gear 51. By this mechanism, I am enabled to engage the teeth of the segment 51 with the teeth of the gear 50, whereupon the handle 53 may be rocked in the proper direction to turn the shaft 26 and the wheels 27, thus accurately positioning the fingers 36 in direct alinement with the marks previously made.

Upon the return trip, the operator keeps close watch on the fingers 36 to maintain them always in the proper position in respect to the marks made opposite the hills previously planted. Should he see that one of the tappet arms 30 is about to contact with the outer arm of the rock lever, before the marking finger 36 has reached its proper position, he may release the pawl on the lever 40 and rock said lever to the rear. This operation will move the carriages 8 and the parts carried thereby forwardly a proper extent to aline the finger 36 with the guiding mark whereupon the pawl 41 may again be allowed to engage the teeth of the rack 42 and the carriages will be located in their adjusted position. Should it be noted by the operator that the machine will drop too late for the desired results, he may rock the lever 40 forwardly which will, of course, pull the carriages 8 rearwardly until the marking fingers are in their proper positions.

The above operations of the carriages 8 may be effected while the machine is in operation, it being entirely unnecessary to suspend the forward movement thereof while said adjustments are being made.

When moving the carriages forwardly, or rearwardly, the engagement of the wheels 27 with the earth will tend to turn the same. This action might produce undesirable results, and in order to overcome the same, it is expedient to engage the teeth of the segment 51 with the spur gear 50 when said carriages are being adjusted. This operation, when the handle 53 is held rigidly, will prevent the wheels 27 from rotating, as will be clearly understood.

Although I have shown my invention as applied to a corn planter of special construction, it will be clearly understood that by making suitable alterations, the movable carriages and the parts carried thereby, may be readily applied to various forms of planters now in use.

I have described my invention with considerable minuteness, but I do not wish to be unduly limited to details other than those amplified in the appended claims.

Having thus described my invention, what I claim as new and desire to secure by Letters Patent is—

1. A corn planter comprising a main supporting axle, supporting wheels thereon, a pair of seed hoppers, seed shoes for said hoppers and an indicator mounted upon said main frame to move toward and away from said axle in planes strictly at right angles thereto, and manually operated means for moving said hoppers, shoes and indicator as a single unit.

2. A corn planter comprising a main supporting axle, supporting wheels thereon, a pair of seed hoppers, seed shoes therefor, and a combined earth marking and indicating element mounted on said frame to move toward and away from said axle in planes strictly at right angles thereto, and manually operated means for moving the hoppers, the shoes and the combined marking and indicating element as a single unit.

3. A corn planter comprising a supporting axle, supporting wheels thereon, a main frame supported by said axle, a supplemental frame mounted on said main frame to move toward or away from said axle and in a plane strictly parallel therewith, seed hoppers, seed shoes, and an indicator on said supplemental frame, and manually operated means for moving the hoppers, the shoes and the indicator toward and away from said axle as a single unit.

4. A corn planter comprising a supporting axle, supporting wheels thereon, a main frame on said axle, a supplemental frame movably mounted on said main frame toward or away from said axle and in a plane parallel therewith, said supplemental frame carrying a seed hopper, a shoe and a bearing, a shaft in said bearing, a marking wheel on said shaft, a tappet on said marking wheel, a lever pivoted on said frame and projecting into the path of said tappet, connections between said seed hopper and said lever for intermittently dropping seed and means for locking said supplemental frame in its adjusted positions.

5. A corn planter comprising a supporting axle, supporting wheels thereon, a main frame on said axle, a supplemental frame movably mounted on said main frame toward or away from said axle, said supplemental frame carrying a seed hopper, a seed shoe and an upright guide, a bearing slidable within said guide, a lateral shaft mounted in said bearing, a marking wheel on said shaft, a tappet on said marking wheel, a lever pivotally mounted on said frame, connections between said lever and said seed hopper for intermittently dropping seed, means for locking said supplemental frame in its adjusted positions, and means for yieldingly holding said marking wheel in contact with the ground.

6. In a corn planter, the combination with a main frame and supporting wheels therefor, of longitudinally extending tracks on said frame, carriages mounted for longitudinal movement on said tracks, transverse bars connecting said carriages, guide yokes rising from one of said bars, bearings movably mounted in said yokes, springs for forcing said bearings downwardly, a shaft mounted in said bearings, marking wheels on said shaft, tappets on said wheels, levers pivoted to said yokes and projecting into the paths of said tappets, seed hoppers and shoes mounted on said cross bars, connections between said levers and said seed hoppers for intermittently dropping seed and means for locking said carriages against movement.

In testimony whereof I have hereunto set my hand in presence of two subscribing witnesses.

ALBERT J. FELSMAN.

Witnesses:
 FRANK L. LEFTRIDGE,
 CHARLES W. FLACK.

---

Copies of this patent may be obtained for five cents each, by addressing the "Commissioner of Patents, Washington, D. C."